March 8, 1966  K. E. LEINFELT  3,239,244
DETACHABLE CONNECTION FOR TUBULAR MEMBERS
Filed May 6, 1963
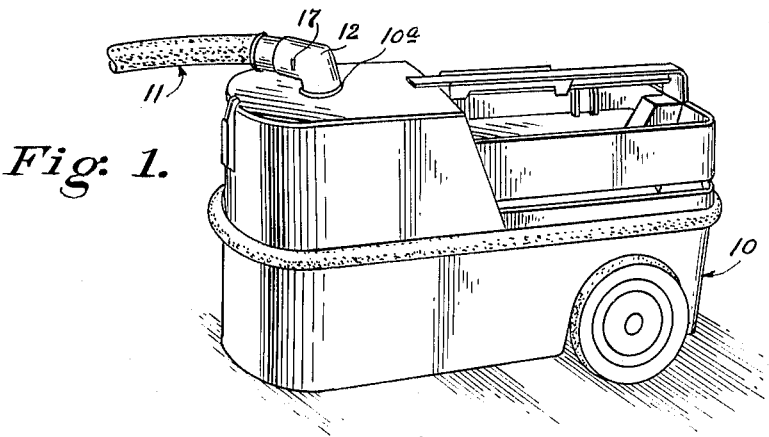
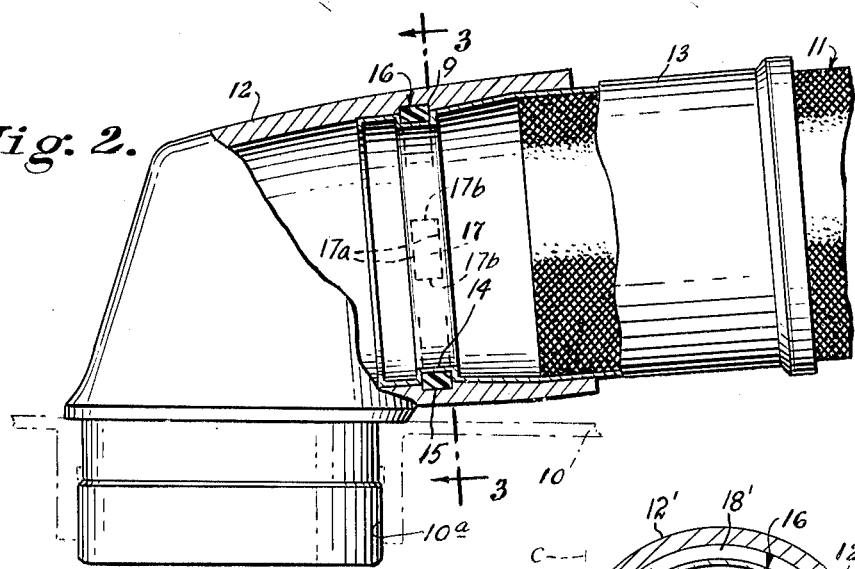
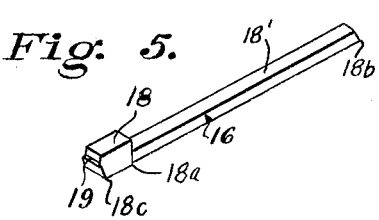
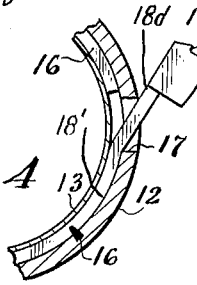
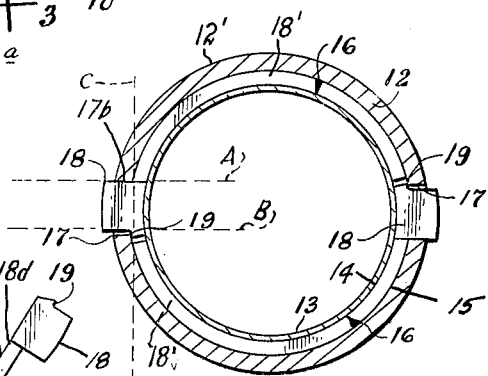
INVENTOR.
KARL ERIC LEINFELT
BY
Edmund A. Fernander
his ATTORNEY.

United States Patent Office 3,239,244
Patented Mar. 8, 1966

3,239,244
DETACHABLE CONNECTION FOR TUBULAR MEMBERS
Karl Eric Leinfelt, Solna, Sweden, assignor to Aktiebolaget Electrolux, Stockholm, Sweden, a corporation of Sweden
Filed May 6, 1963, Ser. No. 278,036
Claims priority, application Sweden, June 15, 1962, 6,738/62
5 Claims. (Cl. 285—7)

This invention relates generally to detachable connections between tubular members which may form part of the air conduit of a suction or vacuum cleaner, such as, the suction hose and coupling member provided at one end thereof for coupling to the suction inlet of a suction or vacuum cleaner.

It is an object of this invention to provide an improved easily detachable connection between tubular members, particularly between the suction hose and a coupling member provided at one end thereof for coupling to the suction inlet of a vacuum cleaner, which connection permits relative rotation of the tubular members while affording a substantially fluid tight seal therebetween.

In accordance with an aspect of this invention, tubular members which are to be detachably connection have end portions axially telescoped within each other and formed with radially opening confronting annular grooves cooperating to define an annular cavity or passage, and the outer tubular member further has at least one radial opening communicating with the groove thereof, and an elongated, normally straight, flexibly resilient locking element is removably inserted into such annular space through each radial opening of the outer tubular member and is cross-sectionally shaped so as to substantially fill the annular space and thereby hold the tubular members against relative axial displacement, the locking element being formed with an enlarged head projecting substantially at right angles to the longitudinal axis of the element at one end thereof and being snugly received in the radial opening when the locking element is substantially completely disposed in the annular space, thereby to avoid inadvertent removal of the locking element from the annular space.

The locking element is preferably formed of a plastic material, such as, polyethylene or the like, which is resiliently flexible and can act as a bearing for relative rotation of the tubular members connected thereby.

In accordance with another important feature of this invention, the enlarged head at one end of the locking element has an outwardly facing shoulder located at the side of the head remote from the elongated locking element and being resiliently engageable under the outer tubular member at the periphery of the radial opening in the latter, thereby to resist inadvertent removal of the locking element from the annular space defined by the confronting grooves of the tubular members.

Further objects and advantages of the invention will become apparent as the following description proceeds, and the features of novelty which characterize the invention will be pointed out with particularity in the claims annexed to and forming a part of this specification.

For a better understanding of the invention, reference may be had to the following description taken in connection with the accompanying drawing, in which:

FIG. 1 is a perspective view of a suction or vacuum cleaner provided with a suction conduit that includes a flexible hose and a coupling member detachably connected at one end thereof in accordance with one embodiment of this invention;

FIG. 2 is an enlarged side elevational view, partly broken away and in section, showing the detachable connection between the suction hose and the coupling member at one end thereof;

FIG. 3 is a sectional view taken along the line 3—3 on FIG. 2;

FIG. 4 is a fragmentary sectional view similar to a portion of FIG. 3, but illustrating the insertion or removal of one of the locking elements by which the suction hose and coupling member are detachably connected to each other; and FIG. 5 is a perspective view of a locking element as formed for use in detachably connecting tubular members in accordance with this invention.

Referring to the drawing in detail, and initially to FIG. 1 thereof, it will be seen that a suction or vacuum cleaner 10 is there illustrated to be of the type that is usually used commercially, as for the cleaning of hotels, restaurants and the like. The suction cleaner 10 generally includes an elongated wheeled casing which, at its forward portion, is adapted to contain a dust bag (not shown) and has a suction inlet 10a at the top through which dust-laden air is drawn into the dust bag by means of motor-fan units (not shown) mounted in the back end portion of the casing. The suction or vacuum cleaner further includes a suction hose 11 having a coupling member 12 rotatably mounted at one end thereof for removable and rotatable mounting in the suction inlet 10a of the vacuum cleaner while the other end of hose 11 is intended to be connected to various nozzles, brushes and the like for different cleaning jobs. As shown, the coupling member 12 is tubular and has substantially right-angularly related end portions. One of the end portions of coupling member 12 is removably and rotatably secured in the suction inlet of vacuum cleaner 10, in a known manner, while the opposite end portion of coupling member 12 telescopically receives a tubular socket or terminal sleeve 13 which is secured, in a known manner, on the end of the suction hose 11.

In accordance with this invention, the detachable connection of the terminal sleeve 13 of suction hose 11 to the coupling member 12 is achieved by providing the free end portion of sleeve 13 with a radially outward opening annular groove or depression 14, while the end portion of coupling member 12 which receives the socket 13 is formed with an internal, radially inward opening annular groove or depression 15 which is located to confront or register with the groove 14 and thereby cooperate with the latter in defining an annular cavity or passage between coupling member 12 and sleeve 13, as shown on FIG. 2. The coupling member 12 is further provided with one or more radial openings 17 communicating with the groove 15. Each opening 17 is preferably circumferentially elongated so that the length of each opening 17 in the circumferential direction is substantially greater than the radial dimension of the annular cavity or passage defined by the cooperating grooves 14 and 15.

In the illustrated embodiment of the invention, the coupling member 12 has two diametrically opposed openings 17, but it is to be understood that either a single opening or three or more equally spaced apart openings may be provided in place thereof.

In accordance with the invention, the detachable connection of the terminal sleeve 13 of hose 11 within the end portion of coupling member 12 is effected by means of an elongated, normally straight, flexibly resilient locking element 16 inserted into the annular cavity defined by the grooves 14 and 15 through each of the openings 17. The element 16 has a suitable rectangular, triangular or other cross-sectional shape dimensioned to substantially fill the annular cavity or passage and thereby act as a substantially fluid-tight seal between the coupling member 12 and sleeve 13. The length of each element 16 is substantially equal to the circumferential distance around the sleeve 13 at the groove 14 divided by the number of openings 17 provided in the coupling member 12. Thus, where the coupling member is provided with two diametrically opposed openings 17, as in the illustrated embodiment of the invention, each locking element 16 has a length equal to substantially one-half the circumference of sleeve 13 at the groove 14, as is apparent on FIG. 3.

Each locking element 16 is preferably formed of a plastic material, such as, polyethylene or the like, which is sufficiently resiliently flexible so that, although the elongated locking element is formed so as to be normally straight, as shown on FIG. 5, it can be more or less tangentially introduced into the annular cavity through the circumferentially elongated opening 17 and will flex so as to follow the curvature of the outer groove 15 (FIG. 4). By reason of the relatively low coefficient of friction of the mentioned plastic material with respect to the socket or terminal sleeve 13 on the hose 11, and further by reason of the tendency of the elongated locking element 16 to return to its normally straight condition which causes the element to bear radially outward in groove 15, thereby avoiding substantial contact pressure between the locking element 16 and the bottom of the groove 14, the socket or terminal sleeve 13 will be rotatably supported within the coupling member 12 by the locking elements 16 while being held against axial displacement relative to the coupling member.

Further, in accordance with this invention, each locking element 16 is formed, at one end thereof, with an enlarged head 18 which projects therefrom substantially at right angles to the longitudinal axis of the locking element 16. The head 18 is dimensioned so as to be snugly received in the related radial opening 17 when the locking element 16 is completely disposed within the annular cavity defined by grooves 14 and 15. Since the radial opening 17 has substantially radial surfaces at its opposite ends, the snug engagement of the enlarged head 18 of element 16 in opening 17 will prevent longitudinal displacement of the latter within the annular cavity and, thereby prevent inadvertent removal of the locking elements from the cavity, particularly when the sleeve 13 is turned relative to coupling member 12 in the direction that would tend to drive the locking elements tangentially out of the openings 17.

Withdrawal of each locking element 16 from the cavity requires that the head 18 be initially pulled radially out of the related opening 17. In order to prevent inadvertent radially outward removal of the enlarged head 18 from its snug engagement within the opening 17, the head 18 is preferably formed with an outwardly facing shoulder 19 (FIGS. 3, 4 and 5), at the side thereof remote from the locking element 16. Thus, when the head 18 is engaged in the opening 17, the shoulder 19 engages under coupling member 12 at the edge of the opening 17, as shown on FIG. 3, and thereby resiliently holds head 18 in opening 17.

When it is desired to disconnect the socket or terminal sleeve 13 of hose 11 from coupling member 12, the enlarged head 18 of each locking element 16, which head is dimensioned so as to project radially out of the opening 17, as shown on FIG. 3, is manually grasped and pulled outwardly for disengaging shoulder 19 from under coupling member 12. Such disengagement is made possible by the flexibly resilient character of the plastic of which the locking element is formed. After withdrawal of head 18 from opening 17, the head 18 is further pulled in the tangential direction so as to remove the locking element 16 from the annular cavity.

Although the terminal sleeve 13 of hose 11 and the coupling member 12 are shown provided with single grooves 14 and 15, respectively, cooperating to define a single annular cavity for receiving the locking elements 16, it will be understood that the terminal sleeve 13 and coupling member 12 may be each similarly formed with two or more axially spaced apart annular grooves cooperating to define a similar number of axially spaced apart annular cavities each receiving one or more of the sealing elements 16 in the manner described above.

In view of the foregoing, it will now be understood that a detachable air-tight coupling has been provided in a vacuum cleaner air line 11 and 12 through which flow of air is effected, the coupling including the coupling member 12 which functions as an outer tubular member and sleeve 13 which functions as an inner tubular member and telescopically fits within the outer tubular member, as shown in FIG. 2. The spaced outer and inner cylindrical surfaces respectively of the telescopically fitting inner and outer tubular members 13 and 12, which are rotatable and angularly movable with respect to one another about their longitudinal axes, engage in a bearing interface therebetween. Each of the tubular members 12 and 13 has a circumferential groove of annular form, the groove 15 in the outer tubular member being formed at the inner wall surface thereof, and the groove 14 formed in the inner tubular member 13 opening outward. The part of the inner tubular member 13 between its inner surface and the groove 14 formed therein defines a ring-shaped zone which is imperforate, as shown in FIG. 2. The grooves 14 and 15 in the tubular members form a ring-shaped cavity 9 when directly opposite one another. The outer tubular member 12 is formed with spaced openings 17 which extend through the wall thereof to its outer surface 12' from the inwardly opening groove 15 at the inner surface thereof.

The tubular members 12 and 13 are detachably connected by ring-shaped connecting means which is disposed in the ring-shaped cavity 9 and manually insertable into and removable from the cavity. In the preferred embodiment shown, which illustrates one manner of practicing the invention, the ring-shaped connecting means comprises a plurality of elongated removable connecting members 16 each having first and second sections 18' and 18, respectively, which are joined to one another and in end-to-end relation. The first section 18' of each elongated member is longer than the second section 18 thereof and has a cross-sectional area and shape throughout its length from 18a to 18b which is substantially the same as the cross-sectional area and shape of the ring-shaped cavity 9 formed by the cooperating grooves 14 and 15. The first and second sections 18' and 18 of each elongated member are defined in part by a single continuous surface 18d extending from one end 18b to the opposite end 18c thereof. The ring-shaped connecting means including the elongated connecting members 16 is self-sustaining and formed of synthetic resinous material possessing elastic physical properties, each of the elongated connecting members 16 being flexible in the direction of its length to form an elongated curved body which is disposed in the ring-shaped cavity 9 with the single continuous surface 18d thereof bearing against the bottom of the outwardly opening groove 14 of the inner tubular member 13.

The second section 18 of each elongated connecting member 16 forms an enlarged head which is of larger cross-sectional area than that of the first section 18'. Each of the enlarged heads 18 projects outward from the ring-shaped cavity 9 into a different one of the openings 17 and snugly fits therein. The ring-shaped connecting means formed by the elongated flexible connecting members 16 in the ring-shaped cavity 9 is disposed in air-tight sealing relation between the outer and inner tubular members 12 and 13, respectively, the coefficient of friction of the synthetic resinous material forming the elongated members 16 being sufficiently low for the tubular members 12 and 13 to be manually moved angularly with respect to one another about their longitudinal axes when turning movement is imparted to one of the tubular members resulting from manipulation of the air line when the vacuum cleaner is being operated.

The enlarged heads 18 of the elongated connecting members 16 are accessible at the exterior of the outer tubular member 12. Each opening 17 is defined by two pairs of spaced walls 17a and 17b, as shown in FIG. 2. The spaced walls 17a of one pair extend circumferentially of the ring-shaped cavity 9, and the spaced walls 17b of the other pair are transverse to the walls 17a and extend crosswise of the ring-shaped cavity. As shown in FIG. 3, the walls 17b of the openings 17, in a section normal to the longitudinal axes of the tubular members 12 and 13, are disposed in parallel planes (indicated by dotted lines A and B) substantially perpendicular to the circumferentially extending head-forming second section 18 (indicated by dotted line C) of the elongated member 16 snugly fitting in the opening. Further, the walls 17b of each opening 17 (indicated by the dotted lines A and B) are spaced from one another substantially the circumferential length of the head-forming section 18 therein. With this arrangement, the head-forming sections 18 when released move into the openings 17 with a snap fit and accidental removal of the heads 18 from the openings 17 in which they snugly fit is minimized, and the heads 18 may be grasped to remove from the ring-shaped cavity 9 the ring-shaped connecting means formed by the elongated flexible members 16 and effect separation of the outer and inner tubular members without tools.

The head-forming sections 18 include sides at the outer ends 18c of the elongated members 16. A part 19 projects outward from each such side which, when the head 18 snugly fits in one of the openings 17, extends into the ring-shaped cavity and engages the inner surface of the outer tubular member 12 at one of the walls 17b of the opening extending crosswise of the cavity, as shown in FIG. 3.

Further, although a particular embodiment of the invention has been described in detail herein with reference to the accompanying drawing, which embodiment is applied to the detachable connection of a coupling member to one end of a suction hose, it will be understood that the invention is not limited to that precise embodiment or application thereof, and that various changes and modifications may be effected therein by one skilled in the art without departing from the scope or spirit of the invention, which is intended to be defined in the appended claims.

I claim:

1. In a vacuum cleaner having an air line through which flow of air is effected, the air line having a detachable air-tight coupling including an outer tubular member and an inner tubular member which telescopically fits within the outer member, the spaced outer and inner cylindrical surfaces respectively of the telescopically fitting inner and outer tubular members, which are rotatable and angularly movable with respect to one another about their longitudinal axes, engaging in a bearing interface therebetween, the combination of a circumferential groove of annular form in each of the tubular members, the groove in the outer tubular member being formed at the inner wall surface thereof and opening inward, the groove formed in the inner tubular member opening outward, the part of the inner tubular member between its inner surface and the groove formed therein defining a ring-shaped zone which is imperforate, the grooves in the tubular members forming a ring-shaped cavity when directly opposite one another, the outer tubular member having at least one opening extending through the wall thereof to its outer surface from the inwardly opening groove at the inner wall surface thereof, ring-shaped connecting means which is disposed in the ring-shaped cavity and manually insertable into and removable from the cavity, the ring-shaped connecting means including at least one elongated removable connecting member having first and second sections which are joined to one another and in end-to-end relation, the first section of the elongated member being longer than the second section thereof and having a cross-sectional area and shape throughout its length substantially the same as the cross-sectional area and shape of the ring-shaped cavity, the first and second sections of the elongated member being defined in part by a single continuous surface extending from one end to the opposite end thereof, the ring-shaped connecting means including the elongated member being self-sustaining and formed of synthetic resinous material possessing elastic physical properties, the elongated member being flexible in the direction of its length to form an elongated curved body disposed in the ring-shaped cavity with the single continuous surface thereof bearing against the bottom of the outwardly opening groove of the inner tubular member, the second section of the elongated member forming an enlarged head which is of larger cross-sectional area than that of the first section and projects outward from the cavity into the opening and snugly fits therein, the ring-shaped connecting means in the ring-shaped cavity and including the elongated connecting member being disposed in air-tight sealing relation between the outer and inner tubular members, the enlarged head of the elongated member being accessible at the exterior of the outer tubular member, the opening being defined by two pairs of spaced walls, the spaced walls of one pair extending circumferentially of the ring-shaped cavity and the spaced walls of the other pair being transverse to the spaced walls of the one pair and extending crosswise of the ring-shaped cavity, and the other pair of walls of the opening, in a section normal to the longitudinal axes of the outer and inner tubular members, being disposed in parallel planes substantially perpendicular to the circumferentially extending head-forming second section of the elongated member fitting in the opening, the other pair of walls of the opening further being spaced from one another substantially the circumferential length of the head-forming section of the elongated member fitting in the opening, whereby the head-forming section when released moves into the opening with a snap fit and accidental removal of the head from the opening in which it snugly fits is minimized and the head may be grasped to remove from the cavity the elongated flexible member of which it forms a part and separate the outer and inner tubular members without tools, the ring-shaped connecting means formed of synthetic resinous material and including the elongated flexible connecting member having a sufficiently low coefficient of friction to render the outer and inner tubular members to be manually moved angularly with respect to one another about their longitudinal axes when turning movement is imparted to one of the tubular members resulting from manipulation of the air line when the vacuum cleaner is being operated.

2. Apparatus as set forth in claim 1 in which the enlarged head of the elongated member snugly fitting in the opening and accessible at the exterior of the outer tubular member includes a portion which projects outward from the outer surface of the outer tubular member, whereby the head may be readily grasped to facilitate removal from the cavity of the elongated flexible member of which it forms a part.

3. Apparatus as set forth in claim 1 in which the head-forming second section of the elongated member includes a side at the extreme outer end of the elongated member, the last-mentioned side having a part projecting outward therefrom which, when the head snugly fits in the opening, extends into the ring-shaped cavity and engages the iner surface of the outer tubular member at one of the walls of the opening extending crosswise of the cavity.

4. In a vacuum cleaner having an air line through which flow of air is effected, the air line having a detachable air-tight coupling including an outer tubular member and an inner tubular member which telescopically fits within the outer member, the spaced outer and inner cylindrical surfaces respectively of the telescopically fitting inner and outer tubular members, which are rotatable and angularly movable with respect to one another about their longitudinal axes, engaging in a bearing interface therebetween, the combination of a circumferential groove of annular form formed in each of the tubular members, the groove in the outer tubular member being formed at the inner wall surface thereof and opening inward, the groove formed in the inner tubular member opening outward, the part of the tubular member between its inner surface and the groove therein defining a ring-shaped zone which is imperforate, the grooves in the tubular members forming a ring-shaped cavity when directly opposite one another, the outer tubular member having a plurality of spaced openings which extend through the wall thereof to its outer surface from the inwardly opening groove at the inner wall surface thereof, a plurality of elongated removable connecting members each having first and second sections which are joined to one another and in end-to-end relation, the first section of each elongated member being longer than said second section thereof and having a cross-sectional area and shape throughout its length substantially the same as the cross-sectional area and shape of the ring-shaped cavity, the first and second sections of each elongated member being defined in part by a single continuous surface extending from one end to the opposite end thereof, the elongated members being self-sustaining and formed of synthetic resinous material possessing elastic physical properties and flexible in the direction of their lengths to form elongated curved bodies disposed in end-to-end relation in the ring-shaped cavity with the single continuous surfaces thereof bearing against the bottom of the outwardly opening groove of the inner tubular member, the second section of each elongated member forming an enlarged head which is of larger cross-sectional area than that of the first section and projects outward from the cavity into a different one of the openings and snugly fits therein, the elongated connecting members in the ring-shaped cavity being disposed in air-tight sealing relation between the outer and inner tubular members, the enlarged heads of the elongated members being accessible at the exterior of the outer tubular member, each opening being defined by two pairs of spaced walls, the spaced walls of one pair extending circumferentially of the ring-shaped cavity and the spaced walls of the other pair being transverse to the spaced walls of the one pair and extending crosswise of the ring-shaped cavity, and the other pair of walls of each opening, in a section normal to the longitudinal axes of the outer and inner tubular members, being disposed in parallel planes substantially perpendicular to the circumferentially extending head-forming second section of the elongated member fitting in the opening, the other pair of walls of each opening further being spaced from one another substantially the circumferential length of the head-forming section of the elongated member fitting in the opening, whereby the head-forming second sections when released move into the openings with a snap fit and accidental removal of the heads from the openings in which they snugly fit is minimized and the heads may be grasped to remove from the cavity the elongated flexible members of which they form a part and separate the outer and inner tubular members without tools, the flexible elongated connecting members formed of synthetic resinous material having a sufficiently low coefficient of friction to render the outer and inner tubular members to be manually moved angularly with respect to one another about their longitudinal axes when turning movement is imparted to one of the tubular members resulting from manipulation of the air line when the vacuum cleaner is being operated.

5. Apparatus as set forth in claim 4 in which the enlarged heads of the elongated members snugly fitting in the openings and accessible at the exterior of the outer tubular member each includes a portion which projects outward from the outer surface of the outer tubular member, whereby the heads may be readily grasped to facilitate removal from the ring-shaped cavity of the elongated flexible members of which they form a part, the sides of the head-forming second sections at the extreme outer ends of the elongated members each having a part projecting therefrom which, when the heads snugly fit in their respective openings, extends into the ring-shaped cavity and engages the inner surface of the outer tubular member at one of the walls of the openings extending crosswise of the cavity.

References Cited by the Examiner
UNITED STATES PATENTS

| | | | |
|---|---|---|---|
| 2,013,660 | 9/1935 | Lauer | 285—305 |
| 3,127,199 | 3/1964 | Roe | 285—305 X |

FOREIGN PATENTS

| | | |
|---|---|---|
| 501,895 | 4/1954 | Canada. |
| 1,243,193 | 8/1960 | France. |
| 1,310,712 | 10/1962 | France. |
| 874,954 | 4/1953 | Germany. |

CARL W. TOMLIN, *Primary Examiner.*